United States Patent [19]

Inkmann

[11] 4,221,847
[45] Sep. 9, 1980

[54] METHOD AND APPARATUS FOR STORAGE BATTERY ELECTROLYTE CIRCULATION

[75] Inventor: Mark S. Inkmann, Milwaukee, Wis.

[73] Assignee: Globe-Union Inc., Milwaukee, Wis.

[21] Appl. No.: 72,097

[22] Filed: Sep. 4, 1979

[51] Int. Cl.$^2$ ............................................. H01M 2/40
[52] U.S. Cl. ........................................ 429/70; 429/81; 429/82
[58] Field of Search ................................. 429/72–89, 429/67, 70

[56] References Cited

U.S. PATENT DOCUMENTS

| | | | |
|---|---|---|---|
| 2,584,117 | 2/1952 | Elrod, Jr. .......................... 429/70 X |
| 3,040,116 | 6/1962 | Gauvin ............................. 429/71 X |
| 3,083,253 | 3/1963 | Sundberg .......................... 429/70 X |
| 3,166,447 | 1/1965 | Bronstert et al. ................. 429/70 |
| 3,247,024 | 4/1966 | Tamminen ......................... 429/70 |
| 3,290,176 | 12/1966 | Berju et al. ...................... 429/67 |
| 3,664,876 | 5/1972 | Carl ................................. 429/70 X |

Primary Examiner—Charles F. LeFevour
Attorney, Agent, or Firm—Joseph J. Jochman, Jr.; John Phillip Ryan

[57] ABSTRACT

An electrolyte reservoir in fluid communication with the cell of a storage battery is intermittently pressurized with a pulse of compressed gas to cause a flow of electrolyte from the reservoir to the upper region of less dense electrolyte in the cell. Upon termination of the pressure pulse, more dense electrolyte is forced into the reservoir from the lower region of the cell by the differential pressure head between the cell and reservoir electrolyte levels. The compressed gas pulse is controlled to prevent the entry of gas from the reservoir into the cell.

10 Claims, 4 Drawing Figures

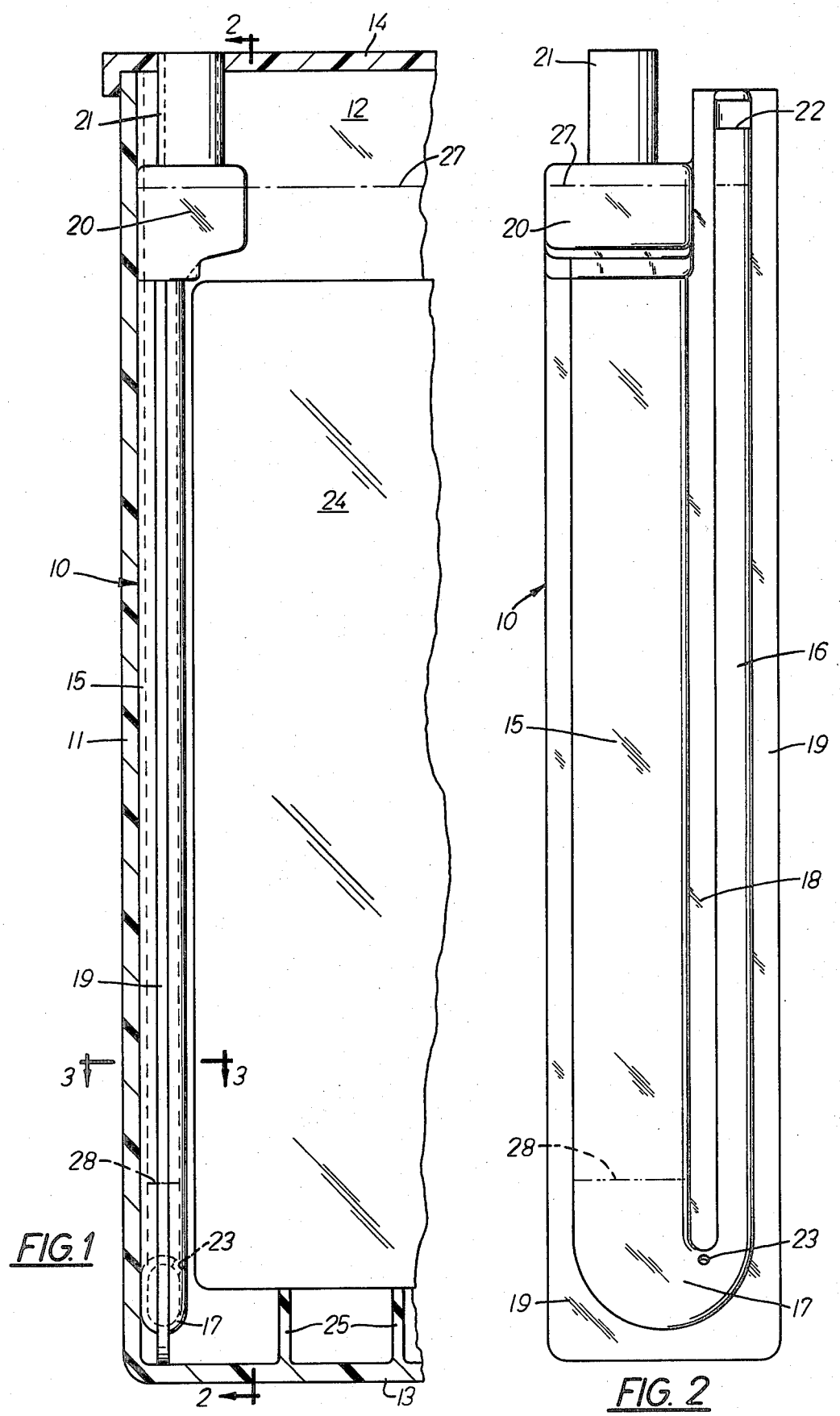

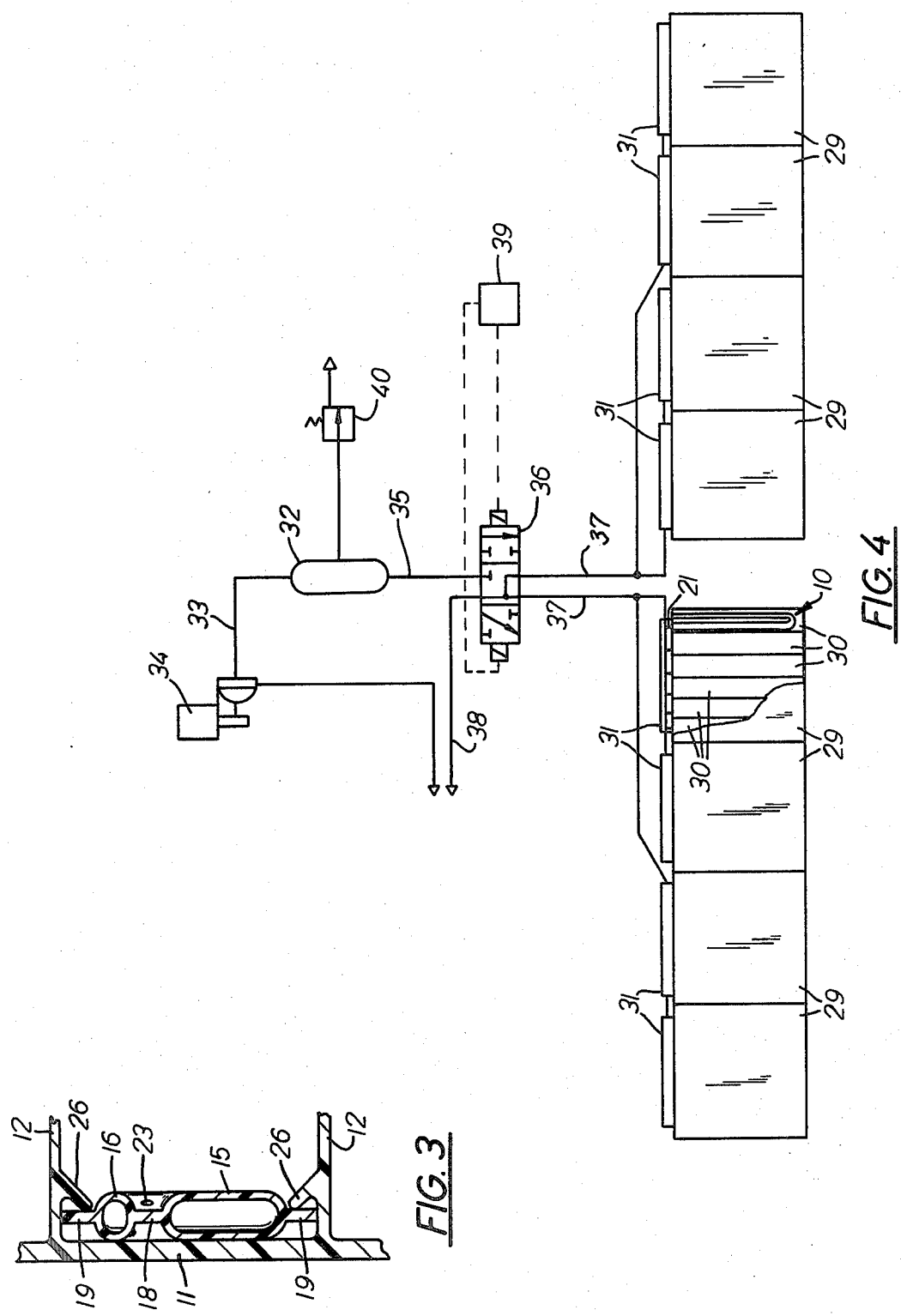

METHOD AND APPARATUS FOR STORAGE BATTERY ELECTROLYTE CIRCULATION

The Government of the United States of America has rights to this invention pursuant to Contract No. 31-109-38-4205 awarded by the U.S. Department of Energy.

BACKGROUND OF THE INVENTION

The present invention relates to the elimination of stratification of liquid electrolyte in an electric storage battery and, more particularly, to an improved method and apparatus for circulating the electrolyte within a battery cell by the application of compressed air to move more dense electrolyte from the lower to the upper portion of the cell.

It is well known in the battery art that stratification of the liquid electrolyte in secondary cells occurs inevitably during cycling of the cells and results in the settling of more dense and highly concentrated electrolyte at the bottom of the cell. In a lead-acid cell, the acid electrolyte which becomes more highly concentrated at the bottom through such stratification will eventually result in corrosion of the electrode plates in the lower portion of the cell. This corrosion has a direct adverse effect on the cycle life (number of discharge-charge cycles) of the cell and, in the most severe case, the accumulation of corroded plate material at the bottom of the cell can result in a short circuiting between adjacent positive and negative plates.

Numerous devices have been used in attempts to prevent or reduce electrolyte stratification, including mechanical mixers or agitators and hydraulic or pneumatic circulation systems and apparatus. Mechanical mixers have invariably proven to be too cumbersome, complex, or expensive to be of any practical benefit. Although some hydraulic and pneumatic systems have been developed which are more efficient and cost-effective, these also have exhibited significant deficiencies of various types which have made them commercially impractical.

For example, U.S. Pat. Nos. 3,166,447, 3,247,024, and 3,664,876 all show electrolyte circulation systems in which a volume of electrolyte from an external or separate reservoir is circulated through the cell in a closed path. All of these systems require a substantial additional volume of electrolyte beyond that contained in the cell; and, the reservoir required to hold the electrolyte adds considerably to the total volume of the battery package. In addition, the pump required to circulate the liquid electrolyte consumes considerable power.

Alternate systems, exemplified by U.S. Pat. Nos. 2,584,117, 3,040,116, and 3,083,253, disclose the use of compressed air to introduce air bubbles into the electrolyte below the surface and, as the bubbles rise to the surface, they carry more dense electrolyte from the bottom to the top of the cell. These systems are quite efficient and, in general, are lighter, require less space and consume less power than liquid pump circulation systems. However, they have one serious drawback in that the air bubbles which are released at the electrolyte surface also cause some of the electrolyte to be dispersed into the air above the surface. This phenomenon, sometimes referred to as "misting," causes a depletion of electrolyte in the cell.

One prior art attempt to circulate the electrolyte by air pressure without introducing the air into the electrolyte is disclosed in U.S. Pat. No. 3,290,176. The device disclosed therein alternately forces electrolyte from an opening in the top of a reservoir into the upper portion of the cell by air pressure and allows electrolyte to return to the reservoir through the same opening upon release of the air pressure. There is, however, no direct circulation of the dense electrolyte from the bottom of the cell nor any means for assuring that any circulation will occur should the electrolyte level fall too far below the opening.

SUMMARY OF THE INVENTION

The present invention comprises a novel apparatus and method for providing the positive circulation of liquid electrolyte within a cell by the application of compressed air without introducing air into the electrolyte in the cell. A pulse of compressed air is applied to the electrolyte in a reservoir to pump a volume of electrolyte from the reservoir to the upper portion of the cell. Between pulses, hydrostatic pressure forces dense electrolyte from the bottom of the cell into the reservoir to refill it for the subsequent pulse. An accumulator in the compressed air circuit is charged with a small air pump between pulses to provide the required flow rate of air and eliminate the need for a large and heavy air pump.

BRIEF DESCRIPTION OF THE DRAWINGS

FIG. 1 is a vertical section through a portion of one cell of a battery in which there is installed the electrolyte circulation device of the present invention.

FIG. 2 is a front elevation of the circulation device shown in FIG. 1 and taken generally on line 2—2 thereof.

FIG. 3 is a horizontal section through the circulation device and the cell taken on line 3—3 of FIG. 1.

FIG. 4 is a schematic of a system embodying the apparatus of the subject invention.

DESCRIPTION OF THE PREFERRED EMBODIMENT

In the drawings, FIG. 1 shows a section through one cell of a battery in which there is installed an electrolyte circulation device 10. The circulation device lies against the side wall 11 of the battery container and between the cell partitions 12, and extends vertically from the container bottom 13 to the cover 14. When used in a lead-acid battery, the device may be conveniently blow molded or similarly formed from polypropylene or any other suitable material which is resistant to attack by the sulfuric acid electrolyte.

In the preferred embodiment shown in FIGS. 1, 2 and 3, the circulation device 10 includes an electrolyte reservoir 15 having an elongated or oblong cross section and extending substantially the full length of the device. Adjacent and extending generally parallel to the reservoir 15 is an electrolyte outlet conduit 16 having a circular cross section of substantially smaller area than that of the reservoir. The reservoir 15 and the outlet conduit 16 are in fluid communication at their lower ends via a smooth, curved transition region 17 with a cross section which tapers from that of the reservoir to that of the outlet conduit. The reservoir and outlet conduit are separated by an integral intermediate flange 18 and the reservoir, transition region 17 and outlet conduit are surrounded by an integral outer flange 19.

The upper portion of the reservoir 15 includes an enlarged chamber 20 which opens at its top to a cylindrical gas port 21. The upper end of the gas port opens through a hole in the battery cover 14 for connection to a gas supply system to be described hereinafter.

Near the top of the outlet conduit 16 is an outlet opening 22. The outlet opening may be of any convenient shape, but preferably should have an area approximately equal to the cross sectional area of the outlet conduit 16.

In the transition region 17 between the reservoir 15 and the outlet conduit 16, there is disposed an electrolyte inlet 23. The electrolyte inlet comprises a small hole in the wall of the transition region and is located so as to open generally upwardly with its axis disposed at an acute angle from the vertical.

As may be best seen in FIGS. 1 and 3, the circulation device 10 has a very narrow profile, spans the width of the cell and is located closely spaced from the edges of the sandwiched stack of battery plates and separators (generally identified by numeral 24). The plates and separators 24 may be of typical well-known construction and are placed in the cell so that their lower edges rest upon a series of vertical supports 25 molded integrally with the container bottom 13. The upper edges of the plates and separators 24 are spaced from the container cover 14 to provide room for the positive and negative plate connections, as well as the intercell and terminal connections, all in accordance with known battery manufacturing techniques. After installation of the plates and separators, the circulation device 10 is slipped into position in the cell and held firmly by the force imposed on both opposite faces of the outer flange 19 by an angled rib 26 extending integrally from each cell partition 12. The ribs 26 preferably extend vertically from the container bottom 13 to the lower surface of the chamber 20. The main body of the circulation device 10 occupies a very small portion of the total cell volume and the enlarged upper chamber 20 extends over the upper edges of the plates and separators. There is thus very little loss in effective plate area.

The battery cell is filled with electrolyte to a normal level 27 sufficient to cover the plates and separators 24. The electrolyte flows under the normal influence of hydrostatic pressure into the circulation device via the inlet 23 and fills the reservoir 15 and the outlet conduit 16 to the level 27. To provide periodic circulation of the electrolyte, a pulse of pressurized gas (preferably air) is applied to the surface of the electrolyte in the reservoir 15 via the gas port 21. The pressure of the gas forces the electrolyte to flow from the reservoir into the outlet conduit 16 and out the outlet opening 22. Some electrolyte will also be forced to flow out the inlet 23, however, because the inlet is substantially smaller than the outlet opening 22 and therefore provides a much greater resistance to the flow of electrolyte than the outlet opening, a far greater portion of the total flow of electrolyte from the reservoir will be through the outlet opening 22.

The duration of the pulse of pressurized gas is controlled to limit the flow of electrolyte from the reservoir 15 to a second electrolyte level 28 near the bottom thereof, but above the transition region 17 and, most importantly, above the inlet 23 and the lower end of the outlet conduit 16. By thus controlling the flow from the reservoir, no gas is permitted to escape from the inlet 23 or to enter the outlet conduit 16, thus preventing the formation of gas bubbles in the electrolyte in either the cell or the outlet conduit.

The pulse of gas applied to the electrolyte in the reservoir should be at a high enough pressure to expel the electrolyte horizontally from the outlet opening and across a substantial portion of the length of the cell over the plates and separators 24. Alternately, the outlet opening may be vertically disposed or even submerged below the normal electrolyte level 27, however, the circulation of electrolyte has not been found to be as effective in such cases. Also, the discharge from the outlet opening 22 may be increased by preventing reverse flow through the inlet 23 by installing a check valve therein. However, at least two beneficial effects of allowing a small reverse flow through the inlet have been found which together considerably outweigh the advantage of completely restricting reverse flow. First, because the inlet opening is small (preferably less than 0.10 inch or 2.5 mm.), it can become clogged with sediment which inevitably accumulates at the bottom of a cell and the reverse flow will aid in purging the inlet. Second, the reverse flow, particularly if directed upwardly as in the preferred embodiment, has been found to enhance the overall circulation of electrolyte in the cell.

Upon termination of the pulse of pressurized gas, the pressure in the reservoir is relieved by venting through the gas port 21 to atmosphere. Simultaneously with the venting, the differential pressure head between the normal electrolyte level 27 in the cell and the second electrolyte level 28 in the reservoir will cause electrolyte to flow from the cell through the inlet 23 to refill the reservoir 15 to the level 27. The level in outlet conduit 16 will, of course, also return to the same level 27.

As will be readily appreciated from the foregoing description, the alternate pressurization and venting of the reservoir will pump electrolyte therefrom to the upper portion of the cell where the lighter, less dense electrolyte is normally located and allow the reservoir to be refilled with heavier, more dense electrolyte from the lower portion of the cell. Further, the volume and velocity of flow from the outlet opening 22 may be controlled so that the more concentrated electrolyte is discharged over substantially the entire surface of electrolyte in the cell from where it may naturally flow downwardly between the plates and separators 24.

Because the reservoir and outlet conduit are always refilled with and contain more dense electrolyte, the outlet conduit 16 need not be restricted to fluid communication with the reservoir 15 at or close to their lower ends. Instead, the outlet conduit may receive a flow of electrolyte via a connection to the reservoir at any level, so long as the second electrolyte level 28 does not drop to such fluid connection or communication means. One means of raising the fluid communication between the reservoir and outlet conduit (thus effectively reducing the length of the latter) without reducing the discharge volume therebetween would be to increase the volume of the chamber 20 at the top of the reservoir. By so increasing the chamber volume, an equivalent volume of electrolyte may be pumped with a smaller end-of-pulse difference between electrolyte levels 27 and 28. Correspondingly, the inlet 23 may also be raised somewhat from its preferred location, however, there would be some sacrifice in density of electrolyte taken in at the higher level, as well as in reservoir refill time because of the lower differential pressure head between the normal level 27 and the second level 28 (the latter being higher than that of the preferred embodiment).

On the other hand, the chamber 20 may be eliminated completely and a reservoir provided which has a uniform cross section throughout its full length. The use of a chamber 20 has, however, been found to be convenient and practical in providing the transition from the reservoir to the gas port 21, the latter being offset laterally somewhat from the reservoir for facilitating its connection to the container cover 14.

The choice of inlet and outlet opening sizes is based on the primary goal of maximizing the outlet flow of electrolyte. At the same time, however, consideration must be given to making the inlet opening adequately large so that it will not be easily plugged by solids in the electrolyte and will provide reasonably rapid reservoir refill. In the presently preferred embodiment an outlet opening 22 of about 0.05 sq. in. (0.3 sq. cm.) through which is discharged an electrolyte volume of 0.7 fl. oz. (20 cc.) per pulse is used with a circular inlet 23 having a diameter of 0.09 in. (2.29 mm.) or an area of 0.006 sq. in. (0.04 sq. cm.).

FIG. 4 shows a schematic representation of an electrolyte circulation system including the circulation device described above, as well as the additional elements and their arrangement in a circuit for periodically applying a pulse of pressurized gas to a multi-cell battery pack. A set of eight storage batteries 29 is shown, each having six cells 30. Circulation device 10 is disposed within each cell 30, only one being schematically shown in FIG. 4. Each battery 29 is provided with an air manifold 31 which may be disposed over the battery cover or made as an integral part thereof. The manifold includes an air outlet for each gas port 21, and preferably pairs of adjacent manifolds are connected in series.

Pressurized air for the system is supplied by an accumulator 32 which receives air, via line 33, from an air pump 34. The flow of pressurized air from the accumulator outlet 35 to the batteries 29 is controlled by a three-position valve 36. The valve 36 is operable in its right or left of center position to direct a pulse of compressed air via feed line 37 to the four manifolds 31 of one battery group to activate the flow of electrolyte through each of the circulation devices 10 and, in its centered position as shown, to shut off the supply of air from accumulator outlet 35 and allow the pressure in the reservoirs 15 to be relieved by venting back through feed lines 37, the valve 36 and vent line 38 to atmosphere. Instead of a single three-position valve 36, a pair of two-position three-way valves, performing the same functions of the three-position valve, may also be used. In either case, the valves are solenoid operated and incorporated into the electrical control circuit for operating the air pressure supply and distribution system. Operation of the valve or valves 36 is controlled by an electric reset timer 39 which is set to periodically open the valve to provide a short duration pulse of air from the accumulator 32, alternately to the two feed lines 37. Between pulses, both lines 37 are vented to atmosphere allowing circulation devices 10 to refill with electrolyte.

In the system shown in FIG. 4, a small, continuously operating diaphragm air pump 34 with an average output of 0.2 cfm. (5l/min.) pressurizes the accumulator 32 to 4 psi. A relief valve 40 limits the maximum pressure in the accumulator to 4 psi. The accumulator volume is 0.17 cubic feet. The timer 39 is set to provide a pulse of compressed air for 0.5 second separately to each feed line 37 every 40 seconds. Between pulses, the accumulator is recharged and the circulation devices are refilled with electrolyte, each requiring about 20 seconds in the system described. It has been found that the electrolyte recirculation volumes at the intervals provided by this system is adequate to prevent electrolyte stratification. However, a broad range of recirculation volumes, pulse intervals and pulse duration times may be successfully employed, depending on the size and capacities of the cells 30 and the circulation devices 10.

I claim:

1. An apparatus for circulating the liquid electrolyte within the cell of a storage battery, said apparatus comprising:
   (1) an electrolyte reservoir isolated from the cell and having a first electrolyte level corresponding to the normal level of electrolyte in the cell;
   (2) inlet means for admitting electrolyte from the lower portion of the cell into the reservoir;
   (3) outlet means for directing a flow of electrolyte to the upper portion of the cell from the reservoir;
   (4) fluid communication means operatively connecting the inlet and outlet means to the reservoir below the first electrolyte level;
   (5) a gas port in the reservoir above the first electrolyte level;
   (6) a source of pressurized gas in communication with the gas port; and,
   (7) means for periodically applying the pressurized gas to the surface of the electrolyte in the reservoir at a volume sufficient to lower the surface to a second electrolyte level above the fluid communication means and to cause at least a part of the electrolyte in the reservoir to flow through the outlet means.

2. The apparatus of claim 1 wherein the differential pressure head between the electrolyte level in the cell and the second electrolyte level provides, alternately with the operation of the means for periodically applying the pressurized gas, a flow of electrolyte through the inlet means and fluid communication means.

3. The apparatus of claim 2 wherein:
   (1) the reservoir is disposed within the battery cell; and,
   (2) the fluid communication means comprises an opening in the reservoir near the bottom thereof.

4. The apparatus of claim 3 wherein the bottom of the reservoir is disposed near the bottom of the cell.

5. The apparatus of claim 2 wherein the outlet means comprises a generally vertically extending conduit having an outlet opening disposed near the surface of the electrolyte in the cell.

6. The apparatus of claim 5 wherein the outlet opening of the outlet means is disposed above the level of electrolyte in the cell.

7. The apparatus of claim 6 wherein the resistance to electrolyte flow through the inlet means is greater than that through the outlet means.

8. The apparatus of claim 6 wherein the inlet means includes a check valve preventing the reserve flow of electrolyte therethrough.

9. The apparatus of claim 1 wherein the means for periodically applying the pressurized gas comprises:
   (1) an air pump;
   (2) an accumulator having:
      (a) an inlet for receiving the air flow from the pump to charge the accumulator; and,
      (b) an outlet in communication with the gas port in the reservoir; and,
   (3) control means for:

(a) releasing a timed pulse of compressed air from the accumulator outlet to the gas port; and, (b) relieving the pressure of the compressed air in the reservoir.

10. A method for circulating the liquid electrolyte within the cell of a storage battery comprising the steps of:

(1) providing a separate electrolyte reservoir in communication with the cell and having a first electrolyte level corresponding to the level of electrolyte in the cell;

(2) pressurizing the reservoir above the electrolyte with a pulse of pressurized gas to cause a flow of electrolyte from the reservoir;

(3) directing at least a part of the flow of pressurized electrolyte from the reservoir to the upper portion of the cell;

(4) controlling the duration of the pulse of pressurized gas to prevent the flow of gas from the reservoir to the cell;

(5) relieving the gas pressure in the reservoir; and, (6) admitting electrolyte into the reservoir from the lower portion of the cell under the influence of the differential pressure head of the electrolyte in the cell and reservoir.

* * * * *